3,702,161
WING LIFT LINKAGE
Ralph K. Zachary and John F. Luoma, Lisbon, N. Dak., assignors to Clark Equipment Company, Buchanan, Mich.
Filed June 29, 1971, Ser. No. 157,978
Int. Cl. A01b 49/00, 63/00
U.S. Cl. 172—311     18 Claims

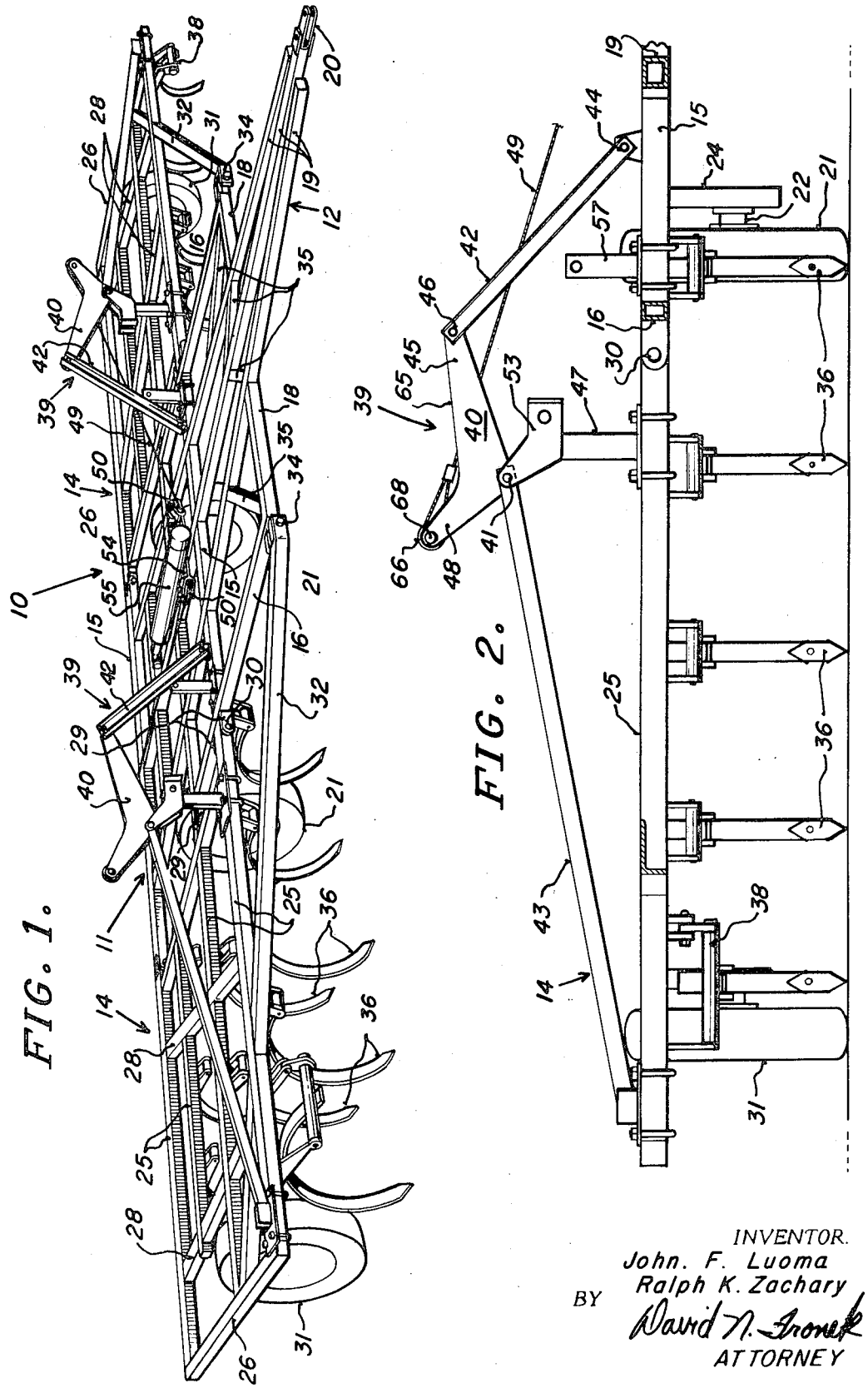

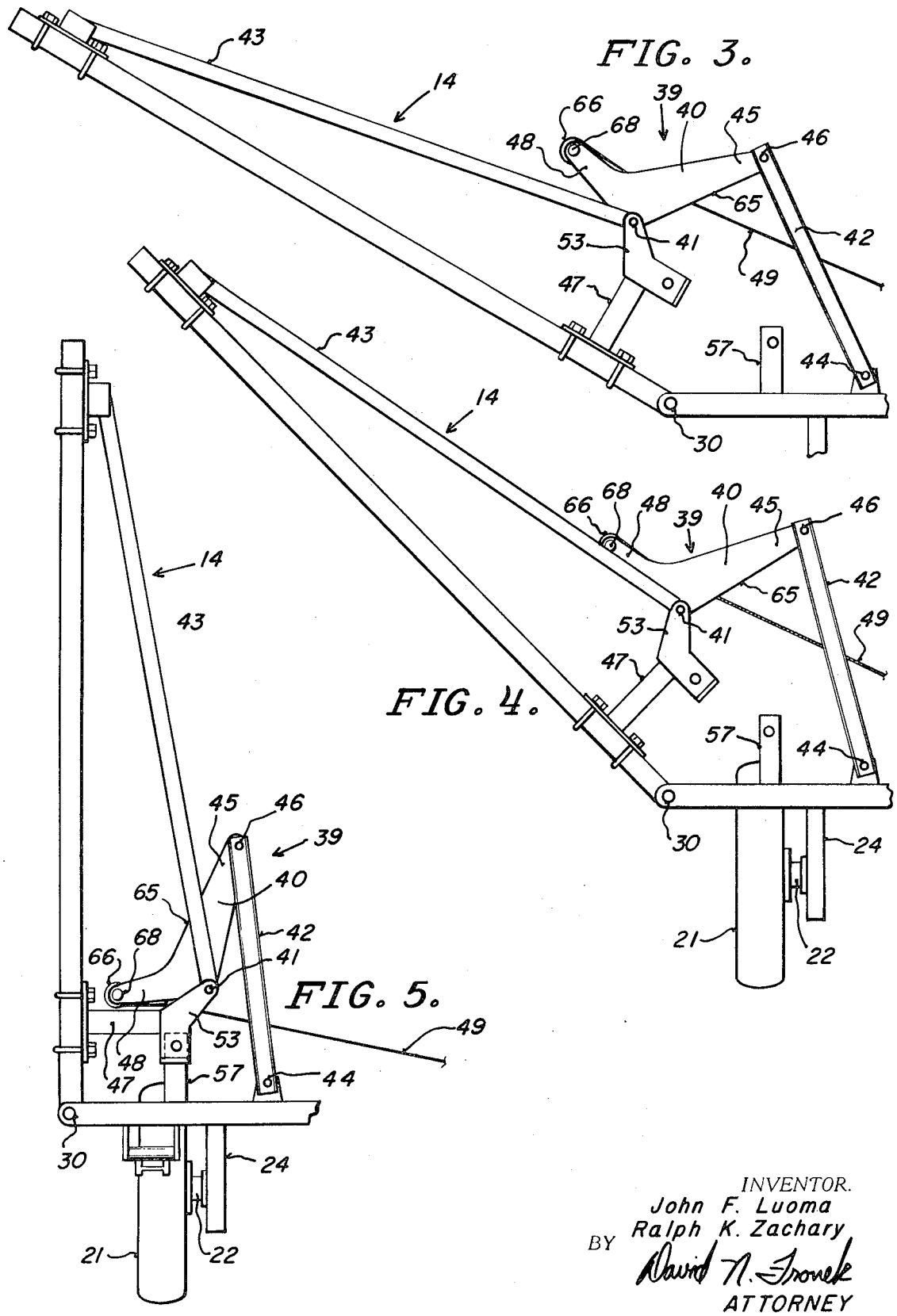

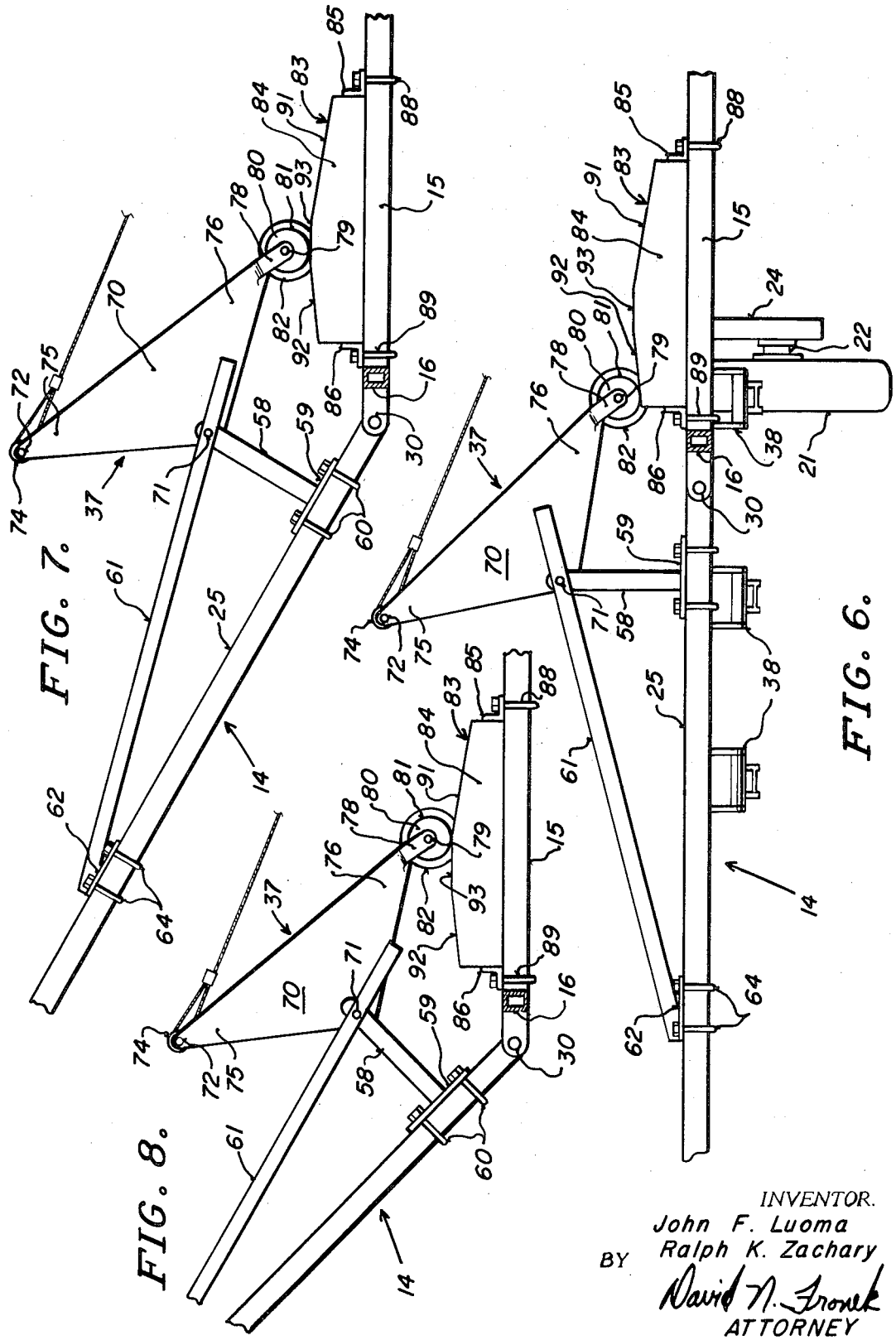

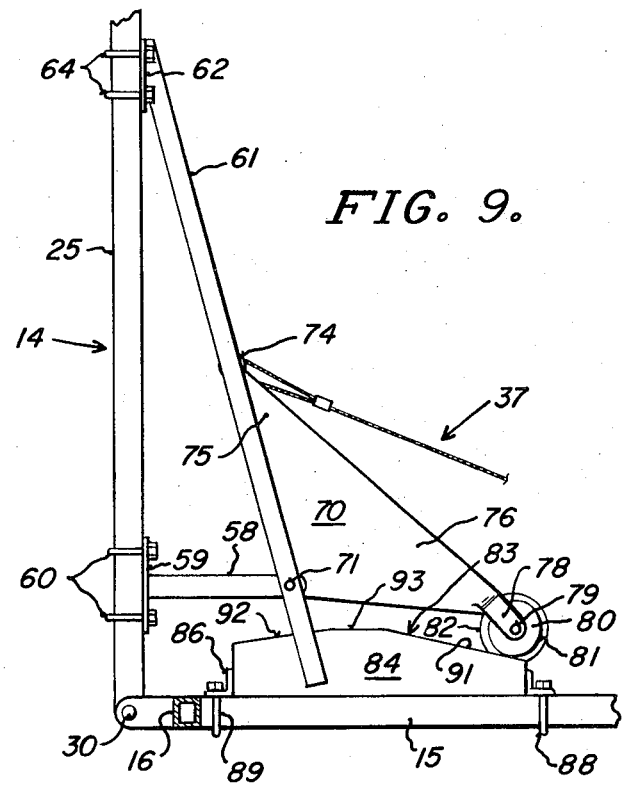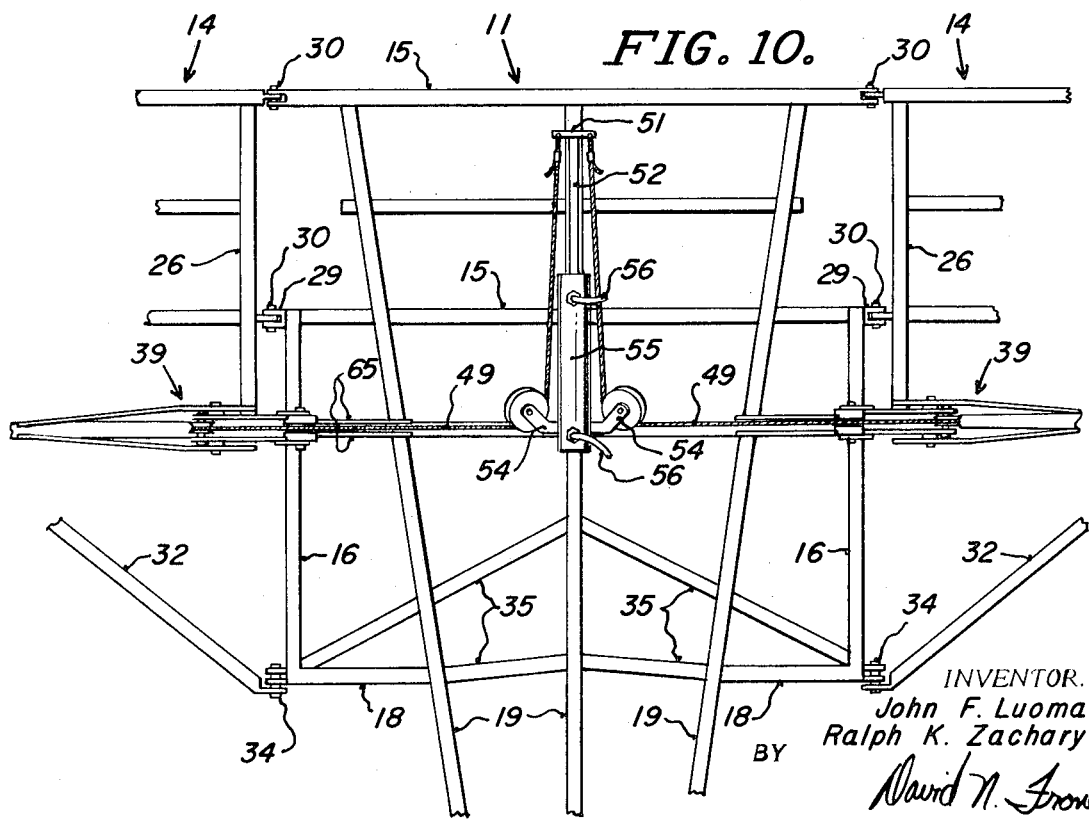

ABSTRACT OF THE DISCLOSURE

A multi-section implement having an improved lift mechanism for raising at least one of said sections from a lowered field position to a raised transport position, said improved lift mechanism including a bellcrank pivotally secured to said section to be raised, means for guiding one end of said bellcrank for predetermined movement, and actuating means connected with a second end of said bellcrank for moving said bellcrank and thereby raising said section to be raised, whereby a mechanical advantage is realized in terms of force necessary to raise said section and movement of said actuating means.

BACKGROUND OF THE INVENTION

The present invention relates generally to a ground working type of farm implement having a plurality of sections including a carriage section and a pair of wing sections pivotally connected with the carriage section, and more specifically, to a lift mechanism for pivoting the wing sections from a lowered field position to a raised transport position.

Due to the considerable time and money that can be saved by decreasing the number of swaths necessary to plow, disc, harrow, mow or cultivate a particular area, farm implements for working the ground have been designed with considerable widths, sometimes including widths of up to 50–60 feet. While highly desirable for field use, an implement of such width is not transportable on a highway, cannot be pulled through a normal fence gate, and requires an unduly large floor area for storage. Consequently, most of the large earth working implement having a considerable width have sections which are collapsible with respect to each other so that the total implement can be broken down and folded into a more compact unit when field use is not desired and when the implement is desired to be transported or stored.

As a result, it is desirable to design an earth working implement having a plurality of sections which are pivotally mounted with respect to each other and each of which includes an efficient mechanism for properly pivoting certain sections of the implement to change the implement from a lowered field position to a raised or folded transport position.

Most of the prior art implements of the type described above include a center carriage, a pair of wing sections on each side of the carriage section and pivotally mounted to the carriage section for pivotal movement upwardly when it was desired to change the implement from a field position to a transport position, and a lift mechanism including a cable or other connecting means having one end connected to a portion of each of the wing sections and the other end connected to a hydraulic cylinder or other actuating means for retracting the cable and thereby pivoting the wing section about the carriage section. The carriage section is normally supported by a pair of wheels and connected to a drawbar for attachment to a towing vehicle. One of the most significant limitations of the lift mechanism for these multisectioned implements was that there was no mechanical advantage either in terms of the force required to pivot the wing section about the center carriage section or in terms of reducing the distance of the cable travel, and thereby the movement of the hydraulic cylinder, to raise the wing sections from a field position to a transport position.

SUMMARY OF THE INVENTION

In contrast to the implements of the past, the present invention provides an improved and more efficient lift mechanism for changing the implement from a lowered field position to a raised transport position. The implement of the present invention includes a center carriage section supported by a pair of wheels, a draw bar section connected to the front end of the carriage section for attachment to a towing vehicle, a pair of wing sections pivotally connected to each side of the carriage section, and an improved lift mechanism for raising the wing section from a lowered field position to a raised transport position.

More specifically, the improved lift mechanism of the present invention provides for the raising of the wing sections from a lowered field position to a raised transport position with a susbtantially smaller force and a substantially smaller cable or hydraulic cylinder movement. In other words, the lift mechanism of the present invention has a very definite mechanical advantage over the lift mechanisms disclosed in the prior art.

The specific structure of the lift mechanism of the present invention includes a bellcrank pivotally mounted to the wing section wherein said bellcrank has a first arm or first portion guided for predetermined movement as the wing section is moved from a lowered field position to a raised transport position by means connected with the carriage section and a second arm or second portion to which a cable is attached for transmitting the force of the hydraulic cylinder or actuating means to the bellcrank to raise the wing section. The dimensions and position of the bellcrank are such that there is a maximum lever arm being applied for pivoting the wing sections about the carriage member and such that, for all practical purposes, the cable or hydraulic cylinder travel is at a minimum.

In the description of the preferred embodiment, two alternative embodiments are described in detail. One of the embodiments shows a control link pivotally connected at one end to the carriage section and pivotally connected at its other end to a portion of the bellcrank for guiding that portion of the bellcrank for predetermined movement with respect to the carriage section as the wing section is pivoted upwardly. An alternative embodiment shows an elongated cam surface mounted to the carriage section and disposed to engage a roller means pivotally mounted to a portion of the bellcrank for guiding that portion for predetermined movement with respect to the carriage section as the wing section is pivoted upwardly.

Accordingly, it is an object of the present invention to provide a multisectioned implement including an improved and more efficient wing lift mechanism for raising the wing section from a lowered field position to a raised transport position.

Another object of the present invention is to provide a multisectioned earth working implement having an improved wing lift mechanism for pivoting the wing sections from a field position to a transport position wherein the wing lift mechanism requires less force and less cable or hydraulic cylinder movement than in prior machines to pivot the wing section from a field position to a transport position.

Another object of the present invention is to provide an improved and more efficient lift mechanism for a multi-section implement which utilizes a bellcrank linkage for raising the wing section for a lowered field position to a raised transport position.

Another object of the present invention is to provide a left mechanism for raising a wing section about a carriage section of an implement with a minimum amount of force and a minimum amount of cable or hydraulic cylinder movement.

A further object of the present invention is to provide a lift mechanism for a multi-sectioned implement which has a very distinct and definite mechanical advantage over lift mechanisms disclosed in the prior art.

These and other objects of the present invention will become apparent upon reference to the description of the preferred embodiment, the drawings, and the appended claims.

DESCRIPTION OF THE DRAWINGS

FIG. 1 is a perspective view of the entire multi-section implement of the present invention in a lowered field position.

FIG. 2 is a partial front elevated view of the implement of the present invention showing the preferred embodiment of the lift mechanism with the wing section in a lowered field position.

FIG. 3 is a front elevated view of the preferred embodiment of the lift mechanism with the wing section raised to an angle of (30) thirty degrees.

FIG. 4 is a front elevated view of the preferred embodiment of the lift mechanism with the wing section raised to an angle of (45) forty-five degrees.

FIG. 5 is a front elevated view of the preferred embodiment of the lift mechanism with the wing section in a raised transport position.

FIG. 6 is a front elevated view of an alternative embodiment of the lift mechanism with the wing section in a lowered field position.

FIG. 7 is a front elevated view of an alternative embodiment of the lift mechanism with the wing section raised to an angle of (30) thirty degrees.

FIG. 8 is a front elevated view of an alternative embodiment of the lift mechanism with the wing section raised to an angle of (45) forty-five degrees.

FIG. 9 is a front elevated view of an alternative embodiment of the lift mechanism with the wing section in a raised transport position.

FIG. 10 is a top elevated view of the carriage section and actuating means of the implement of the present invention.

DESCRIPTION OF THE PREFERRED EMBODIMENT

As shown in FIG. 1, the earth working implement 10 of the present invention includes a centrally located carriage section 11, a forwardly located drawbar section 12, and a pair of wing sections 14, 14 pivotally connected to either side of the carriage section 11.

The centrally located carriage section 11 includes a plurality of center beams 15 extending across the carriage section 11 in a direction transverse to the movement of the implement 10 and a pair of side frame members 16 connected with the ends of the plurality of center beams 15 to thereby define a portion of the carriage section 11. The forward end of each of the side frame members 16 connects with a forward center beam 18 to form the forward portion of the carriage section 11. A plurality of convergent structural members 19 extend from one of the center beams 15, past the forward center beam 18, and converge to form the drawbar section 12 of the implement 10. A suitable device or hitch 20 is connected to the forward end of one of the members 19 for attachment to an appropriate tractor or draft vehicle.

The carriage section 11 is supported above the ground by a pair of transversely spaced-apart wheels 21. As better shown in FIG. 2 which shows one of the wheels 21, each of the wheels 21 is carried by an axle 22 which in turn is mounted to one of the center beams 15 by a suitable axle mounting 24.

Referring again to FIG. 1, each of the wing sections 14, 14, includes a plurality of spaced-apart wing beams 25 extending across the sections 14, 14 in a direction transverse to the movement of the implement 10 and a pair of end frame members 26 extending in a direction parallel to the movement of the implement 10 and connecting with the ends of the wing beams 25 for defining the wing sections 14, 14. A pair of transverse frame members 28 extend between the wing beam 25 to brace the beams 25 and to give the wing section 14 additional support.

Each of the wing sections 14 is pivotally connected to the carriage section 11 by means of a plurality of spaced apart tongue members 29 mounted to the side frame members 16 and by the pin 30 passing between each of the members 29 and through the end of each of the wing beams 25. This pivotal connection also supports one end of each of the wing sections 14, 14 above the ground. The other end of the wing section 14 is supported by the wheel 31 which is attached to one of the wing beams 25 in a manner which is similar to the attachment of the wheels 21 to the center beams 15.

Each of the wing beams 14, 14 are further braced and connected with the carriage section 11 by the diagonal braces 32, 32 which extend from a portion of the wing section 14 to a forward portion of the frame member 16 where it is pivotally connected by the pin 34. The drawbar section 12 is additionally braced by a plurality of braces 35 extending transverse to the members 19.

A plurality of spring tooth cultivator shovels 36 are connected to the wing beams 25 of each of the wing sections 14, 14 and to the center beams 15 of the carriage section 11 by a suitable clamp 38. It should be recognized that while the implement is shown with cultivator teeth or shovels, the cultivator teeth are shown for illustrative purposes only and a plurality of different tools or shovels can be used merely by replacing the teeth shown in FIG. 1 with them. The type of tooth or tool is unimportant for purposes of this invention.

Also shown in FIG. 1 is the preferred embodiment of the lift mechanism 39 for pivoting the wing sections 14, 14 upwardly with respect to the carriage section 11 about the pivot 30 to raise the wing sections 14, 14 from a lowered field position (FIG. 1) to a raised transport position (FIG. 5 and 9).

The preferred embodiment of the lift mechanism of the present invention can be seen best by referring to FIG. 2. As shown in FIG. 2, the lift mechanism 39 includes a bellcrank 40 pivotally connected to a portion of the wing section 14 at the intersection of two braces 43 and 47 by the pin 41 and a control link 42 pivotally connected at one end to one of the center beams 15 by the pin 44 and pivotally connected at its other end to a first portion or first end 45 of the bellcrank 40 by the pin 46. Both of the braces 43 and 47 are rigidly secured to one of the wing beams 25 by a suitable clamp. The brace 47 includes a member 53 which is designed to cooperate with an upstanding member 57 rigidly secured by an appropriate clamp to the center beam 15 to prevent the wing section 14 from pivoting past a raised transport position which is shown on FIG. 5. Although not specifically shown, the wing section 14 can be retained in the raised transport position shown in FIG. 5 by means of a bolt passing through the aligned holes in the members 53 and 57.

A second portion or second end 48 of the bellcrank 40 is connected with a cable 49 which extends from the second end 48 through a pulley 50 (FIG. 10) and then to a plate 51 disposed on the end of the hydraulic cylinder piston rod 52. The pulley 50 is mounted to a portion of the carriage section 11 by the pulley arm 54.

As best seen now in FIG. 10, a hydraulic cylinder 55 is rigidly mounted to the carriage section 11 and includes a piston rod 52 which moves into and out of the cylinder 55 in accordance with the hydraulic pressure applied to the cylinder 55 through the hydraulic hoses 56, 56 which are connected to a hydraulic pressure source (not shown) on the towing vehicle. When the piston rod 52 moves outwardly with respect to the cylinder 55, the cables 49 are retracted to thereby pivot the wing sections 14, 14 about the pivot 30 to a transport position. When the piston rod 52 moves into the cylinder 55, the cables 49, 49 are extended to thereby lower the wing sections 14, 14 from a raised transport position to a lowered field position.

Although not specifically shown, the bellcrank 40 of FIGS. 2, 3, 4 and 5 includes a pair of spaced apart plates 65 between which is journaled a roller 66 by the pin 68. The purpose of the roller 66 is to provide a means to which the cable 49 may be attached to reduce any frictional forces which may develope between the cable and the bellcrank as the wing section 14 is pivoted from a field position to a transport position.

By referring to FIGS. 2, 3, 4 and 5 which show the wing section 14 in a lowered position, a raised position, and various intermediate positions therebetween, it can be seen that the first end 45 of the bellcrank 40 moves in a circular arc about the pin 44 and the section of the bellcrank 40 pivotally connected to the wing section 14 by the pin 41 moves in a circular arc about the pivot 30. In contrast to the circular movement of the pins 46 and 41, the pin 68 located on the second end or second portion 48 of the bellcrank 40 moves in an arcuate path which is not circular, but which is defined by the predetermined circular movement of the pins 41 and 46. With the specific construction and movement of the lift mechanism as described above, a mechanical advantage is realized both in terms of reducing the amount of force necessary to pivot the wing section 14 to a transport position and in terms of reducing the movement of the cable necessary to pivot the wing section to a raised transport position.

An alternative embodiment of the present invention is shown in FIGS. 6, 7, 8 and 9. As shown in FIG. 6, a bellcrank 70 which is comprised of a pair of spaced-apart plates is pivotally connected to a portion of the wing section 14 by the pin 71. The pin 71 is rigidly secured to the wing section 14 by the upstanding member 58 and the brace 61 which are respectively connected to the wing beam 25 by the plates 59 and 62 and the U-bolts 60 and 64. A first end or first portion 76 of the bellcrank 70 includes a bifurcated flange 78 to which a roller 80 is pivotally secured by the pin 79. The roller 80 includes a guide portion 82 designed to extend between a pair of spaced-apart cam plates 84 and a roller portion 81 disposed on either side of the guide portion 82 and designed to engage the cam surface 83 which is defined by the upper portion of the pair of cam plates 84. The cam plates 84 are welded to a pair of angle braces 85, 86 which are in turn rigidly secured to the center beam 15 by a pair of U-bolts 88 and 89. More specifically, the cam surface 83 include a pair of marginal portions 91 and 92 and an intermediate portion 93 located between the two marginal portions.

A second end or second portion 75 of the bellcrank 70 includes a roller 74 journaled between the pair of plate members by the pin 72. As with the second end 48 of the bellcrank 40 (FIG. 2) a cable 49 is connected to the roller 74 to transfer the lifting force from the hydraulic cylinder 55 (FIGS. 1 and 10) to the bellcrank 70.

As can be seen with reference to FIGS. 6, 7, 8 and 9 which show the wing section in a lowered position, in a raised position, and in various intermediate positions, the roller 80 moves along the cam surface 83 as the wing section 14 pivots from a lowered field position to a raised transport position. Therefore, as the wing section 14 pivots with respect to the carriage section, the first section 76 moves along a path defined by the cam surface 83, the pin 71 moves in a circular arc about the pivot 30, and the pin 72 and thus the second end 75 of the bellcrank 70 moves in an arcuate path as a result of the predetermined movement of the roller 80 and the pin 71. While the wing section 14 is being raised from a field position (FIG. 6) to a position in which the wing section 14 is approximately at a 45 degree angle as shown in FIG. 8, the roller 80 engages the marginal portion 92 of the cam surface 83. When the wing section 14 reaches an angle of about 45 degrees with the horizontal, the roller 80 engages the intermediate portion 93 of the cam surface 83. Finally, as the wing section 14 moves from an angle of about 45 degrees with respect to the horizontal to a folded or transport position, (FIG. 9), the roller 80 engages the marginal or inclined portion 91 of the cam surface 83.

Like the structure of the preferred embodiment of the lift mechanism which is shown in FIGS. 2, 3, 4 and 5, the structure of the alternative embodiment of the lift mechanism which is shown in FIGS. 6, 7, 8 and 9 provides a mechanical advantage in terms of reducing the force and cable movement necessary to pivot the wing section 14 from a lowered field position to a raised transport position.

The invention described herein may be embodied in other specific forms other than the embodiment described hereinabove without departing from the spirit or characteristic of the present invention. The present embodiments, therefore, are to be considered in all respects as illustrative and not restrictive, the scope of the inventions being indicated by the appended claims and their equivalence rather than by the foregoing preferred description.

What is claimed and desired to be secured by United States Letters Patent is:

1. A lift mechanism for an implement having a carriage section, and a wing section pivotable on said carriage about a first horizontal axis from a lowered field position to a raised transport position, said mechanism comprising:
   a bellcrank pivotally secured to said wing section for pivotal movement about a second horizontal axis spaced from said first horizontal axis, said bellcrank having a first end and a second end;
   means connected with said carriage section and said first end of said bellcrank for guiding said first end of said bellcrank for predetermined movement with respect to said carriage section as said wing section is pivoted from said lowered field position to said raised transport position; and
   means on said carriage connected with said second end of said bellcrank for moving said bellcrank toward said carriage section to thereby cause said wing section to pivot about said first horizontal axis from said lowered field position to said raised transport position.

2. The lift mechanism of claim 1 wherein said means for guiding said first end for predetermined movement with respect to said carriage section includes an elongated cam surface extending transversely to said first and second horizontal axes, said cam surface mounted to said carriage section and disposed to engage said first end of said bellcrank.

3. The lift mechanism of claim 2 and roller means mounted to said first end of said bellcrank for engaging said cam surface.

4. The lift mechanism of claim 2 wherein said cam surface includes lowered marginal portions and a raised intermediate portion.

5. The lift mechanism of claim 2 wherein said means connected with said second end of said bellcrank for moving said bellcrank toward said carriage section comprises a cable and a hydraulic cylinder mounted to said carriage section for retracting said cable.

6. The lift mechanism of claim 2 wherein said means for moving said bellcrank toward said carriage section is connected with said second end of said bellcrank at a point above said second horizontal axis.

7. The lift mechanism of claim 1 wherein said means for guiding said first end of said bellcrank for predetermined movement with respect to said carriage section includes a control link pivotally connected at one end to said carriage section and pivotally connected at its other end to said first end of said bellcrank.

8. The lift mechanism of claim 7 wherein said means connected with said second end of said bellcrank for moving said bellcrank toward said carriage section comprises a cable and a hydraulic cylinder mounted to said carriage section for retracting said cable.

9. The lift mechanism of claim 7 wherein said means for moving said bellcrank toward said carriage section is connected with said second end of said bellcrank at a point above said second horizontal axis.

10. An implement comprising:
a carriage section;
a wing section pivotable on said carriage about a first horizontal axis from a lowered field position to a raised transport position; and
a lift mechanism for pivoting said wing section from said lowered field position to said raised transport position including
a bellcrank pivotally secured to said wing section for pivotal movement about a second horizontal axis spaced from said first horizontal axis and having a first end and a second end;
means connected with said carriage section and said first end of said bellcrank for guiding said first end for predetermined movement with respect to said carriage section as said wing section is pivoted from said lowered field position to said raised transport position; and
means on said carriage connected with said second end of said bellcrank for moving said bellcrank toward said carriage section to thereby cause said wing section to pivot about said first horizontal axis from said lowered field position to said raised transport position.

11. The implement of claim 10 wherein said means for guiding said first end for predetermined movement with respect to said carriage section includes an elongated cam surface extending transversely to said first and second horizontal axes, said surface mounted to said carriage section and disposed to engage said first end of said bellcrank.

12. The implement of claim 11 and roller means mounted to said first end of said bellcrank for engaging said cam surface.

13. The implement of claim 11 wherein said cam surface includes lowered marginal portions and a raised intermediate portion.

14. The lift mechanism of claim 10 wherein said means for guiding said first end of said bellcrank for predetermined movement with respect to said carriage section includes a control link pivotally connected at one end to said carriage section and pivotally connected at its other end to said first end of said bellcrank.

15. The implement of claim 10 wherein said means connected with said second end of said bellcrank for moving said bellcrank toward said carriage section comprises a cable and a hydraulic cylinder mounted to said carriage section for retracting said cable.

16. The implement of claim 10 having a wing section at each end of said carriage section and a lift mechanism associated with each of said wing sections.

17. The implement of claim 16 wherein said means connected with said second end of said bellcrank for moving said bellcrank toward said carriage section comprises a cable and a hydraulic cylinder mounted to said carriage section for retracting said cable.

18. The implement of claim 17 wherein a cable is connected at one end to each of said second ends of said bellcranks and is connected at the other end to a hydraulic cylinder horizontally mounted to said carriage section for extending and retracting said cables to thereby simultaneously raise and lower said wing sections.

References Cited
UNITED STATES PATENTS

| | | | |
|---|---|---|---|
| 3,628,613 | 12/1971 | Kaufman | 170—456 X |
| 3,463,241 | 8/1969 | Essex | 170—456 X |

ROBERT E. PULFREY, Primary Examiner

S. C. PELLEGRINO, Assistant Examiner

U.S. Cl. X.R.

172—456; 280—411 R